United States Patent [19]
Tomaschke

[11] Patent Number: 5,922,203
[45] Date of Patent: Jul. 13, 1999

[54] AMINE MONOMERS AND THEIR USE IN PREPARING INTERFACIALLY SYNTHESIZED MEMBRANES FOR REVERSE OSMOSIS AND NANOFILTRATION

[75] Inventor: John E. Tomaschke, San Diego, Calif.

[73] Assignee: Hydranautics, Oceanside, Calif.

[21] Appl. No.: 08/944,995

[22] Filed: Oct. 7, 1997

[51] Int. Cl.⁶ ................................................ B01D 39/00
[52] U.S. Cl. ............... 210/500.37; 210/490; 210/500.38; 210/500.39; 264/41; 427/245; 427/244
[58] Field of Search ............................... 210/490, 500.38, 210/500.37, 500.39; 264/41; 427/244, 245

[56] References Cited

U.S. PATENT DOCUMENTS

| | | |
|---|---|---|
| 3,904,519 | 9/1975 | McKinney, Jr. et al. . |
| 3,996,318 | 12/1976 | van Heuven . |
| 4,167,567 | 9/1979 | McCall . |
| 4,259,183 | 3/1981 | Cadotte . |
| 4,277,344 | 7/1981 | Cadotte . |
| 4,529,646 | 7/1985 | Sundet . |
| 4,613,878 | 9/1986 | Inaba et al. . |
| 4,619,767 | 10/1986 | Kamiyama et al. . |
| 4,661,254 | 4/1987 | Zupancic et al. . |
| 4,761,234 | 8/1988 | Uemura et al. . |
| 4,769,148 | 9/1988 | Fibiger et al. . |
| 4,828,708 | 5/1989 | Bray . |
| 4,872,984 | 10/1989 | Tomaschke . |
| 4,948,507 | 8/1990 | Tomaschke . |
| 5,254,261 | 10/1993 | Tomaschke et al. . |

FOREIGN PATENT DOCUMENTS

| | | | |
|---|---|---|---|
| 753088 | 1/1971 | Belgium ........................... | 210/500.38 |
| 1188577 | 6/1985 | Canada ............................. | 210/500.38 |
| 0176992 | 4/1986 | European Pat. Off. .......... | 210/500.38 |
| 2704600 | 8/1978 | Germany .......................... | 210/500.38 |
| 0001080 | 1/1975 | Japan ................................ | 210/500.38 |
| 1000409 | 1/1986 | Japan ................................ | 210/500.38 |
| 3232523 | 10/1991 | Japan ................................ | 210/500.38 |

OTHER PUBLICATIONS

Samuel D. Arthur, "Structure–Property Relationship In A Thin Film Composite Reverse Osmosis Membrane", Journal of Membrane Science, 46:243–260, Elsevier (1989).

John E. Cadotte, "Evolution of Composite Reverse Osmosis Membranes", Materials Science of Synthetic Membranes, Chapter 12, pp. 273–294, American Chemical Society of Symposium Series (1985).

*Primary Examiner*—Ana Fortuna
*Attorney, Agent, or Firm*—Panitch Schwarze Jacobs & Nadel, P.C.

[57] ABSTRACT

Water permeable reverse osmosis membranes are prepared by interfacially polymerizing on a microporous support an essentially monomeric polyamine reactant having at least two amine functional groups per reactant molecule, and an essentially monomeric amine-reactive polyfunctional aromatic or cycloaliphatic acyl halide having on the average at least about 2 acyl halide groups per reactant molecule. The polymerization is optionally carried out in the presence of a monomeric amine salt, which increases the flux rate of the resulting membrane. Preferred polyamine compounds of the generic formula, which are novel per se, include 3,5-diaminobenzoyl piperazine, 4-aminobenzoyl piperazine, 3-aminobenzoyl piperazine, isophthaloyl piperazine, and terephthaloyl piperazine.

21 Claims, No Drawings

AMINE MONOMERS AND THEIR USE IN PREPARING INTERFACIALLY SYNTHESIZED MEMBRANES FOR REVERSE OSMOSIS AND NANOFILTRATION

BACKGROUND OF THE INVENTION

The present invention relates to novel amine monomers, particularly suited for preparing interfacially synthesized membranes useful for the separation of fluid mixtures and solutions by reverse osmosis and nanofiltration. In particular, the present invention is directed to polyamide water permeable membranes which are useful for desalination of an aqueous solution.

It is known that dissolved substances can be separated from their solvents by the use of selective membranes. For example, of great practical interest is the removal of salt from water by reverse osmosis (RO) or by nanofiltration (NF). The efficiency and economy of such removal is of tremendous economic significance in order to provide potable water from brackish or sea water for household or agricultural use. A critical factor in desalination is the performance of the membrane in terms of salt rejection, i.e., the reduction in salt concentration across the membrane, and flux, i.e., the flow rate across the membrane. For practical RO applications, the flux should be on the order of greater than at least 15 gfd at a pressure of about 15 atmospheres for brackish water. More preferably, commercial RO applications now require fluxes greater than about 25 gfd (about 1.0 $m^3/m^2$-day) at a pressure of about 15 atmospheres for brackish water. NF applications require at least 30 gfd (about $1.2/m^3\ m^2$ -day) at a pressure of 10 atmospheres. Moreover, salt rejections greater than 99% are required for RO and greater than 50% for NF. The continuing goal of research and development in this area is to develop membranes having increased flux and/or salt rejections which are useful in desalination.

Among the known membranes used in desalination are included a large number of various types of polyamides which are prepared by a variety of methods. Of particular interest within this broad group of polyamide membranes are crosslinked aromatic polyamide membranes. The crosslinked aromatic polyamide membranes include, for example, those disclosed in the following U.S. Patents.

U.S. Pat. No. 3,904,519, issued to McKinney et al., discloses reverse osmosis membranes of improved flux prepared by crosslinking aromatic polyamide membranes using crosslinking agents and/or irradiation. The polyamides are prepared, for example, by the interfacial polymerization of amine groups and carboxyl groups followed by crosslinking.

U.S. Pat. No. 3,996,318, issued to van Heuven, teaches the production of aromatic polyamide membranes, wherein crosslinking is achieved using a reactant having a functionality of three or greater.

U.S. Pat. No. 4,277,344, issued to Cadotte, describes a reverse osmosis membrane which is the interfacial reaction product of an aromatic polyamine having at least two primary amine substituents with an aromatic acyl halide having at least three acyl halide substituents. The preferred membrane is made of a poly(phenylenediamine trimesamide) film on a porous polysulfone support.

U.S. Pat. No. 4,761,234, issued to Uemura et al., shows a membrane similar to U.S. Pat. 4,277,344 in which aromatic tri- or higher aromatic amines are employed.

U.S. Pat. No. 4,661,254, issued to Zupanic et al., discloses a reverse osmosis composite membrane formed by the interfacial polymerization of a triaryl triamine with an aromatic carboxylic acid chloride.

U.S. Pat. No. 4,619,767, issued to Kamiyama et al., describes membranes prepared by crosslinking polyvinyl alcohol and secondary di- or higher amines with polyfunctional crosslinking agents. Both aromatic and aliphatic amine components are disclosed.

U.S. Pat. Nos. 4,872,984 and 4,948,507, issued to the present applicant, describe the interfacial synthesis of reverse osmosis membranes from an essentially monomeric polyamine having at least two amine functional groups and an essentially monomeric polyfunctional acyl halide having at least about 2.2 acyl halide groups per reactant molecule, in the presence of a monomeric amine salt. Both aromatic and aliphatic polyamines and polyfunctional acyl halides are disclosed.

Interesting reviews and comparisons of various composite reverse osmosis membranes are included in J. E. Cadotte, "Evolution of Composite Reverse Osmosis Membranes", *Materials Science of Synthetic Membranes*, Chapter 12, pp. 273–294, American Chemical Society Symposium Series (1985) and S. D. Arthur, "Structure-Property Relationship in a Thin Film Composite Reverse Osmosis Membrane", *Journal of Membrane Science*, 46:243–260, Elsevier (1989).

While some of the above-referenced membranes are commercially useable, the goal of the industry continues to be to develop membranes that have better flux and salt rejection characteristics and better resistance to disinfectants such as chlorine, in order to reduce costs and increase efficiency of operation.

BRIEF SUMMARY OF THE INVENTION

Accordingly, an object of the present invention is to provide an interfacially synthesized membrane for reverse osmosis and/or nanofiltration, which has sufficient salt rejection and excellent flux.

This and other objects of the present invention, which will be apparent from the detailed description of the present invention provided hereinafter, have been met by a water permeable membrane prepared by interfacially polymerizing, on a microporous support, (1) an essentially monomeric polyamine reactant of the formula set forth below having at least two amine functional groups, and (2) an essentially monomeric amine-reactive reactant comprising a polyfunctional aromatic or cycloaliphatic acyl halide, or mixtures of these acyl halides, wherein the amine-reactive reactant has, on the average, at least about 2 acyl halide groups per reactant molecule The essentially monomeric polyamine reactant having at least two amine functional groups is a novel amine of the formula I below:

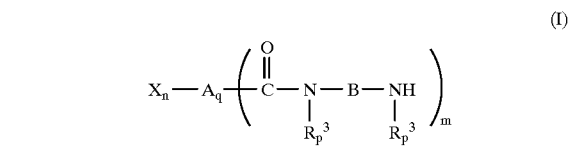

(I)

wherein:
q=0 or 1;
n=0, 1 or 2;
m=2–4, when n=0, but when n=1 or 2, m=1;
when q=1, A=an aromatic (benzene) ring or a $C_3$–$C_6$ alicyclic group, and n=1 or 2 and m=1; but when n=0, A=an aromatic (benzene) ring or a $C_3$–$C_8$ alicyclic group and m=2–4;

when q=0, m=2;

B=a $C_2$–$C_6$ alkylene group, when each of p=1 and $R^3$=H or a $C_1$–$C_3$ alkyl group; but when both p=0, NBN forms a saturated heterocyclic ring having two nitrogen atoms and 3–6 carbon atoms ; and

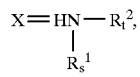

wherein s and t are independently 0 or 1, but are not both =0; $R^1$=H or a $C_1$–$C_3$ alkyl group when s=1; $R^2$=a $C_{1-C3}$ alkylene group when t=1; but when s=0, n=1, and $NR^2A$ forms a saturated heterocyclic ring having one nitrogen atom and 3–6 carbon atoms.

In an optional embodiment of the present invention, the above interfacial polymerization is carried out in the presence of the monomeric amine salt by either (a) a solution containing both a monomeric amine salt and the polyamine reactant being coated on a microporous support prior to coating with a solution of a polyfunctional acyl halide, or (b) a monomeric amine salt solution being coated on a microporous support prior to coating with a polyamine solution and a polyfunctional acyl halide solution.

The resulting polymerizations yield ultrathin membranes on the microporous support. These membranes have excellent salt rejection and fluxes and are suitable for desalination and other applications.

DETAILED DESCRIPTION OF THE INVENTION

The membranes of the present invention may be formed by various methods of interfacial polymerization, a number of which are known in the art. Presently preferred are the methods described in prior U.S. Pat. Nos. 4,872,984 and 4,948,507, the disclosures of which are incorporated herein by reference. While the present invention will now be described herein with reference to the method in which the polymerization is carried out in the presence of an optional monomeric amine salt, it will be understood that the following methods could be carried out without the presence of the monomeric amine salt, which is used in the methods of the prior above-mentioned patents.

In one embodiment, the objects of the present invention have been met by a water permeable membrane produced by the process comprising the steps of:

(a) coating a microporous support with an aqueous solution comprising (I) an essentially monomeric polyamine reactant of Formula I with or without (ii) a monomeric amine salt, to form a liquid layer on said microporous support;

(b) contacting said liquid layer with an organic solvent solution of an essentially monomeric amine-reactive reactant comprising a polyfunctional aromatic or cycloaliphatic acyl halide, or mixture thereof, wherein the amine-reactive reactant has, on the average, at least about 2 acyl halide groups per reactant molecule; and (c) drying the product of step (b) so as to form said water permeable membrane.

In a second embodiment, the water permeable membrane is produced by the process comprising the steps of:

(a) coating a microporous support with a first aqueous solution comprising an optional monomeric amine salt to form a monomeric amine salt layer on said microporous support;

(b) coating said monomeric amine salt layer with a second aqueous solution comprising an essentially monomeric polyamine reactant of Formula I to form a liquid layer on said monomeric amine salt layer.

(c) coating said liquid layer with an organic solvent solution of an essentially monomeric amine-reactive reactant, comprising a polyfunctional aromatic or cycloaliphatic acyl halide, or mixture thereof, wherein the amine-reactive reactant has, on the average, at least about 2 acyl halide groups per reactant molecule; and (d) drying the product of step (c) so as to form said water permeable membrane.

The particular microporous support employed in the present invention is not critical thereto. Examples of such microporous supports useful in the present invention include those made of a polyarylether sulfone, such as a polysulfone and a polyether sulfone; a polyimide; or a polyvinylidene fluoride. The microporous support is preferably made of a polyarylether sulfone. The thickness of the microporous support is not critical to the present invention. Generally, the thickness of the microporous support is about 25 to 125 $\mu$m, preferably about 40 to 75 $\mu$m.

The novel essentially nomomeric polyamine reactant of Formula I according to the present invention has at least two amine functional groups, preferably 2 to 3 amine functional groups, per molecule. The amine functional groups may be primary or secondary amine functional groups. The polyamine reactant may be aromatic, cycloaliphatic, heterocyclic (with nitrogen atoms) or a combination of these.

By appropriate selection of the A group in Formula I, the polyamine reactant may have an aromatic group (e.g., benzene ring) as the nucleus for the pendant amine groups, or may have a cycloaliphatic ring, such as cyclohexane, cyclopentane or cyclobutane. The pendant amine groups for reaction with the amine-reactive reactant may be primary or secondary amine groups, depending upon the selection of X in Formula I.

Preferred polyamine compounds according to Formula I include those in which at least one of the amine functional groups is provided by a piperazine moiety. That is, the NBN group of Formula I forms a piperazine group, in which one of the nitrogen atoms is attached to the carbonyl group and the other nitrogen of the piperazine forms a secondary amine functional group for reaction with the amine-reactive reactant. Both mono- and di-piperazines are included, depending upon the selection of the groups in Formula I.

Particularly preferred polyamine compounds of Formula I include the piperazine-containing compounds 3-5-diaminobenzoyl piperazine, 4-aminobenzoyl piperazine, 3-aminobenzoyl piperazine, isophthaloyl piperazine, and terephthaloyl piperazine. Methods of synthesis of these piperazine-containing compounds are described in detail below. Other compounds of Formula I may be made in similar manners, as will be recognized by one skilled in the art. Well-known methods were employed in the synthesis of the novel amine monomers. For example, the mono-piperazine amines were prepared from aminobenzoic acids that were N-protected, coupled with monoprotected piperazine, then finally deprotected and free-based. The dipiperazine amines, on the other hand, were prepared through direct condensation of aromatic diacyl halides with monoprotected piperazine, then deprotected and free-based.

The amine-reactive reactant used in the present invention may be selected from any of a variety of essentially monomeric, polyfunctional, aromatic or cycloaliphatic acyl halides, or a mixture of such acyl halides, wherein the amine-reactive reactant has, on the average, at least about 2, and preferably, on the average, about three to about four acyl halide groups per reactant molecule.

Preferred amine-reactive reactants are the aromatic acyl halides of U.S. Pat. No. 4,277,344 of Cadotte, which have at least three acyl halide substituents per molecule, e.g., trimesoyl chloride. Also preferred are the difunctional aromatic acyl halides, such as described in U.S. Pat. No. 4,828,708 of Bray, e.g., isophthaloyl chloride or terephthaloyl chloride.

Preferred cycloaliphatic acyl halides for use in the present invention include the cyclohexane tricarbonyl chlorides of U.S. Pat. No. 4,529,646 of Sundet, for example.

Other cycloaliphatic acyl halides for use in the present invention include the tetra-substituted acyl chlorides of cyclopentane tetracarboxylic acid and cyclobutane tetracarboxylic acid, namely 1,2,3,4-cyclopentane tetracarboxylic acid chloride (CPTC) and 1,2,3,4-cyclobutane tetracarboxylic acid chloride (CBTC) and the tri-substituted acyl chlorides of cyclopentane tricarboxylic acid and cyclobutane tricarboxylic acid, namely, 1,2,4-cyclopentane tricarboxylic acid chloride (CPTrC) and 1,2,3-cyclobutane tricarboxylic acid chloride (CBTrC). These cycloaliphatic acyl halides are described in U.S. Pat. No. 5,254,261 of the present applicant.

In addition to the cycloaliphatic acyl halide reactants described above, the amine-reactive reactant may also include in admixture with the cycloaliphatic acyl halide an essentially monomeric polyfunctional aromatic acyl halide having at least about two acyl halide groups per reactive molecule. That is, up to about 90 weight percent, and preferably about 0 to 70 weight percent, of the cycloaliphatic acyl halide may be substituted with one or more aromatic acyl halides.

Examples of such aromatic acyl halides include isophthaloyl halide, trimesoyl halide, terephthaloyl halide, and mixtures thereof. The preferred aromatic acid halides employed in the present invention with or without the cycloaliphatic acyl halide are isophthaloyl chloride (IPC), trimesoyl chloride (TMC) and/or terephthaloyl chloride (TPC).

The monomeric amine salt employed in the present invention may be a salt of a monomeric amine and an acid, and is preferably a salt of a tertiary amine and a strong acid. As used herein, a strong acid is an acid which reacts essentially completely with water to give a hydronium ion. Examples of such strong acids include an aromatic sulfonic acid; an aliphatic sulfonic acid; a cycloaliphatic sulfonic acid, such as camphorsulfonic acid; trifluroacetic acid; nitric acid; hydrochloric acid; and sulfuric acid.

The particular monomeric amine salt employed in the present invention is not critical thereto and may be any aliphatic, alkoxy, cycloaliphatic, heterocyclic or alkanol monomeric amine salt. Preferred monomeric amine salts employed in the invention are represented by formulas (I) and (II) described in U.S. Pat. No. 5,254,261 of the present applicant.

More preferably, the monomeric amine salt employed in the present invention is a water soluble salt of a strong acid and a tertiary amine selected from the group consisting of a trialkylamine, such as trimethylamine, triethylamine, tripropylamine; an N-alkylcycloaliphatic amine, such as 1-methylpiperidine; an N,N-dialkylamine, such as N,N-dimethylethylamine and N,N-dimethylethanolamine; a bicyclic tertiary amine N-dialkyl ethanolamine, such as N,N-dimethylethanolamine; a bicyclic tertiary amine, such as 3-quinuclidinol and mixtures thereof, or a quaternary amine selected from at least one member of the group consisting of a tetraalkylammonium hydroxide, such as tetramethylammonium hydroxide, tetraethylammonium hydroxide, and tetrapropylammonium hydroxide; a benzyltrialkylammonium hydroxide, such as benzyltrimethyl-ammonium hydroxide, benzyltriethylammonium hydroxide, and benzyltripropylammonium hydroxide; and mixtures thereof. A particularly preferred monomeric amine salt is the amine salt of triethylamine amine and camphorsulfonic acid (TEACSA).

The monomeric amine salt is employed either as a solid, which is water soluble, or as an aqueous solution having dissolved therein the monomeric amine salt. The monomeric amine salt is preferably employed as an aqueous solution thereof. The monomeric amine used to prepare the monomeric amine salt preferably has a pKa of more than about 8, more preferably about 8 to 13, most preferably about 9 to 13.

In one embodiment of the present invention, the microporous support is coated with a first aqueous solution containing generally about 0.1 to 5 wt % of a monomeric amine salt, preferably about 0.2 to 2 wt % of a monomeric amine salt. The first aqueous solution is preferably adjusted to a pH of about 5.5 to 13, more preferably about 6 to 12, by controlling the concentration of the acid or the monomeric amine. In this case, the second aqueous solution containing the polyamine reactant of Formula I generally has a pH of about 8 to 12, preferably about 9 to 12. Further, in this case, where the monomeric amine salt and the polyamine reactant are separately coated on the microporous support, the coating amount is generally adjusted so that the molar ratio of the monomeric amine salt to the polyamine reactant is about 0.1 to 8, preferably about 0.5 to 6.

In order to save a step in the process of the present invention, the above aqueous solution of the monomeric amine salt can also contain the polyamine reactant. In this case the aqueous solution is generally adjusted to a pH of about 7 to 13, preferably about 9 to 12. Further, in this case, the molar ratio of the monomeric amine salt to the polyamine reactant is also generally adjusted to about 0.1 to 8, preferably about 0.5 to 6.

The choice of pH depends on the base strength of the particular reactive polyamine employed. In general, the above-described lower range pH value of the reactive polyamine solution should be about the same as the pKa of the particular polyamine employed and the higher range pH value should be about the same as the particular unadjusted free base aqueous pH. In the case of aromatic polyamines, the pKa is in the range of about 4 to 7, whereas with cycloaliphatic polyamines, the pKa is in the range of about 8 to 11.

The above aqueous solutions are coated by any well known means, such as dipping, spraying, roller coating, rod coating or cloth sheet coating and allowed to remain in place generally for about 5 seconds to 10 minutes, preferably about 10 seconds to 1 minute.

If desired, the aqueous solutions may contain a surfactant for more improved results. The particular surfactant employed in the present invention is not critical thereto. Examples of such surfactants include sodium dodecyl benzene sulfonate (SDBS), sodium lauryl sulfate (SLS) or mixtures thereof. The surfactants are generally employed at a concentration of about 0.01 to 0.5 wt %, preferably about 0.1 to 0.3 wt %.

After forming a liquid layer containing the monomeric amine salt and the polyamine reactant of Formula I, a second layer of an organic solvent solution containing the essentially monomeric amine-reactive reactant is coated thereon.

Generally, the organic solvent solution contains about 0.01 to 5 wt/vol %, preferably about 0.02 to 1 wt/vol % of the amine-reactive reactant. It is preferable to employ an about 0.1 to 50, preferably an about 0.2 to 20, molar excess of the polyamine reactant to the amine-reactive reactant.

The organic solvent employed in the present invention is one which is non-miscible with water. The particular organic solvent employed in the present invention is not critical thereto. Examples of such organic solvents include alkanes, such as hexane and nonane; cycloalkanes, such as cyclohexane; and halogenated derivatives thereof, such as FREON ® (E. I. duPont de Nemours), including 1,1,2-trichlorotrifluoroethane; and mixtures thereof. The preferred organic solvents employed in the present invention are alkanes having from 6 to 12 carbon atoms.

The organic solvent containing the amine-reactive reactant is coated by any well known means, such as dipping or spraying, and allowed to remain in place generally for about 3 seconds to 20 minutes, preferably about 5 seconds to 30 seconds.

After each step of coating the aqueous and organic solvent solutions, the excess solutions are removed. Then, after the last coating and draining step, the resulting product is dried to form a water permeable membrane. The resulting product is generally dried in an oven at about room temperature to 160° C., preferably about 100 to 150° C. for about 1 to 10 minutes, preferably about 2 to 8 minutes. In this manner, a polyamide layer is formed on the microporous support. The thickness of the resulting polyamide layer is generally about 0.01 to 1.0 μm, preferably about 0.02 to 0.2 μm.

The following examples are provided for illustrative purposes only and are in no way intended to limit the scope of the present invention. Unless otherwise indicated below, all percentages (%) of ingredients are percent by weight (i.e., wt/wt %).

Syntheses of Amine Monomers

EXAMPLE I

Preparation of 3.5-Diaminobenzoyl piperazine (35DABP)

3,5-diaminobenzoic acid (Aldrich 98%) was refluxed in excess formic acid (Aldrich 96%) at 103° C. for 17 hours to produce the diformyl protected compound in 94% yield. After removal of formic acid, washing with ether and drying, the diformyl compound was reacted at 40° C., for 1 hour in DMF/THF solvent with a stoichiometric amount of 1,1'-carbonyl diimidazole to produce the acylimidazole intermediate. A stoichiometric quantity of 1-formyl piperazine (Lancaster 98%) dissolved in THF was then introduced, the reaction mixture brought to a reflux at 81° C. and kept refluxing for 20 hours. After removal of solvent, washing with water and filtering, the triformyl protected compound was dried and isolated in 90% yield. The deformylation (amino deprotection) reaction was carried out in 1 N sodium hydroxide at room temperature for 15 hours. This solution was adjusted to pH 10 with hydrochloric acid, then evaporated to dryness. The resulting solids were extracted several times with anhydrous ethanol and removed by filtration. The combined ethanol extracts were evaporated, then azeotropically dried with 1,2-dichlorethane producing 3,5-diaminobenzoyl piperazine (35DABP) in 58% yield.

EXAMPLE II–III

Preparation of 3- and 4-Aminobenzoylpiperazine (3ABP, 4ABP)

4-aminobenzoic acid (Aldrich 99%) was reacted stoichiometrically with benzyl chloroformate (Aldrich 95%) in THF solvent in the presence of pyridine acid acceptor initially at 2–25° C. for 1 hour then refluxed 75° C. for 2 hours. After evaporation of solvent, washing the solids in water, filtering and drying, the resulting N-CBZ-protected product was obtained in 85% yield. This compound was first reacted with a stoichiometric quantity of 1,1'-carbonyl diimidazole at room temperature for 2 hours in DMF/THF solvent. A stoichiometric amount of ethyl-1-piperazine carboxylate (Lancaster 99%) in THF was then added to this mix, kept at room temperature for 1 hour, then refluxed at 80° C. for 8 hours. The reaction solution was evaporated to a solid residue, washed with water, filtered and finally dried to obtain the solid diprotected product in 90% yield. This solid was deprotected in excess 5N hydrobromic acid in acetic acid at 48° C. for 10 hours. After evaporation of acidic fluids, the solid residue was washed with acetone then ether, filtered and dried as the dihydrobromide salt. Dissolution of this salt in a stirred aqueous suspension of 2× equivalents of strong base anion exchange resin (Amberlite IRA-400-OH) followed by filtration and washing of resin, evaporation of filtrates and azeotropic drying in anhydrous ethanol then in 1,2-dichloroethane, gave dry 4-aminobenzoyl piperazine (4ABP) solid in 50% yield. 3ABP was prepared in the same manner as above but starting with 3-aminobenzoic acid.

EXAMPLE IV–V

Preparation of Isophthaloyl and Terephthaloyldipiperazine (IDP, TDP)

Isophthaloyl chloride (Aldrich 98%) was reacted with 2 equivalents each of 1-formyl piperazine (Lancaster 98%) and triethylamine in chloroform at room temperature. After 4 hours reaction time the solution was evaporated to dryness and the residue extracted several times with tetrahydrofuran (THF). The solids were removed by suction filtration and the filtrate evaporated and dried to give the diformyl protected IDP product in 89% yield. Deprotection of this compound was carried out at room temperature for 16 hours in 80% methanol:20% concentrated hydrochloric acid. Subsequent evaporation of this solution, washes of the residual solids with THF, suction filtration, and drying, afforded the IDP dihydrochloride salt as a fine white powder. This compound was dissolved in ice water and adjusted to pH 9.8 using strong base ion exchange resin (Amberlite IRA-400 (OH)). After suction filtering and washing off the resin with water, the filtrate was evaporated down azeotropically with acetonitrile providing IDP product in 91% yield. TDP was prepared in the same manner and approximately the same yield, but starting with terephthaloyl chloride.

Syntheses and Testing of Membranes

EXAMPLES 1–6

The five polyamines from preparation examples I–V were used to interfacially synthesize reverse osmosis membranes by reaction with TMC and/or TPC according to the procedures described below. A sixth membrane was synthesized as a control using the same method to react the known polyamine, metaphenylene diamine (MPD), with TMC. All of the novel amine membranes were prepared in a lab-scale control frame procedure in which six-inch squares of polysulfone ultrafilter substrate are clamped between two Teflon® (duPont) frames and coated on the upper surface with an aqueous solution of the amine monomer for 10 seconds. The substrate was then drained for 30 seconds, then contacted for 7.5–15 seconds with an acid chloride crosslinker/Isopar® (Exxon Corp.) hydrocarbon solution. After draining for 15 seconds, the membrane was dried in a convection oven at 125–150° C. for 4–9 minutes. The metaphenylenediamine (MPD) control membranes were prepared similarly except that a soft sheet cloth was used to apply the aqueous solution, and drying consisted of ambient forced air for 1 minute, followed by a convection oven at 100° C. for 6 minutes. The specific details of the membrane preparations are given in Tables 1–6.

Synthesis of Model Compounds

For the purpose of evaluating intrinsic chlorine stability of polyamides obtained from representatives of the various novel amine monomers, dibenzoyl amide model compounds were synthesized. The basic synthetic procedure is very straightforward and can be generalized as discussed below. Thin layer chromatography (TLC) and elemental analyses were performed to confirm reaction completeness and product purity, respectively. Two equivalents of benzoyl chloride (Aldrich 99%) in chloroform were added gradually to a chloroform solution containing one equivalent diamine and two equivalents triethylamine acid acceptor. After a 30-minute addition at approximately 10° C. was completed, the reaction mix was refluxed at 65° C. for 1 hour, then cooled to room temperature. The solution was then evaporated, solids broken up and washed in water thoroughly, and filtered. After overnight drying in a vacuum oven, the dibenzoylamide was obtained in approximately 90% yield.

Chlorine Sensitivity Studies

Model Compounds: One gram fine powder samples of representative dibenzoylamide model compounds were stirred vigorously in sealed jars containing 80 ml. 6% sodium hypochlorite (60,000 ppm)—one adjusted to pH 4 and the other to pH 9 with hydrochloric acid. In this way one can compare the amide model compounds' sensitivity to hypochlorous acid (HOCl) versus hypochlorite (OCl$^-$), respectively. After the room temperature, five hour reaction, the finely distributed solid suspension was collected by suction filtration and washed thoroughly with water. Final drying was completed in a vacuum oven overnight at 60° C. and chlorine uptake (substitution) determined from elemental analyses. Membranes: Samples of performance-optimized membranes prepared from the various novel amines, as well as MPD control amine were compared in dynamic chlorine tests. A baseline performance was first obtained by testing membranes for an overnight period on 1500 ppm sodium chloride, pH 7 at 225 psig. This standard test condition was used throughout the membrane tests after each chlorination interval so that "equilibrated" performances could be compared. Initially, a chlorine exposure of 20 ppm at pH 8 was employed, but was later changed to 50 ppm at pH 6 plus 1000 ppm added calcium chloride in order to accelerate the degradation. An MPD-control membrane was present during each experimental test, such that chlorine sensitivity of an individual novel amine membrane could be compared directly.

Model Compound Chlorine Uptake

For the dibenzoyl model compounds containing aromatic NH groups, such as those synthesized from MPD and 4-ABP (and 3-ABP), significantly more chlorine uptake is found with pH 4 (HOCl) than with pH 9 (OCl$^-$). This is probably due to the fact that both migration of chlorine from amide nitrogen to the activated ring via the Orton rearrangement and direct ring chlorination are acid catalyzed reactions. Thus, the higher values of chlorine uptake for these activated ring compounds at pH 4 probably signify efficient ring chlorination. Interestingly, though the 4-ABP case had the same or greater chlorine uptake at pH 9 as the MPD case, it has less than the latter at pH 4 which one would expect with a more deactivated aromatic ring.

The TDP- and IDP-based model compounds, which contain neither amidic hydrogen nor activated aromatic rings yielded the least chlorine uptake of all the model compounds tested. There is very little difference between the pH 4, and pH 9 chlorine treatment, suggesting that these ring-deactivated compounds ring chlorinate relatively inefficiently.

Membrane Performance

The six membranes were then tested for performance, i.e., flux rate, salt rejection and chlorine resistance, using a 1500 ppm NaCl solution at 225 psig and pH 7 (except as indicated). Transport properties and film thicknesses of membranes prepared from each of the five novel amines and the optimal aromatic acid chloride crosslinkers are shown in Table 1.

Compared to the wholly aromatic MPD-membranes, the novel benzoyl piperazine membranes produce both higher water and salt transport. These membranes have performances ranging from reverse osmosis to nanofiltration and, thus, have utility in low pressure desalination and/or organic solute separations. While applicant does not wish to be bound by any particular theory, one reason for the higher transport of these membranes is probably due to the incorporation of the non-planar piperazine unit. It should also be mentioned that as in the preparing of piperazine-only polyamide membranes, very low concentration of amine monomer (0.20–0.35%) was found to be optimal.

Samples of each of the membranes listed in Table 1 were immersed in dichloromethane to dissolve away the supporting polysulfone layer and release the crosslinked polyamide film layer. After further washing with dichloromethane, these predetermined surface area films were dried and weighed on a microbalance. Final film thickness is calculated by dividing the film volume by the area, after determining volume from film weight and estimated film density. As can be seen in Table 1, membrane film thicknesses ranged from a low of 210 Å for 35-DABP to a high of 680 Å for TDP, and all were less than that of the MPD membrane. It is believed that several factors influence the polyamide film thickness, such as monomer size, solubility, shape and reactivity.

Membrane Chlorine Resistance

It was anticipated that the more highly ring-activated 35-DABP-polyamide membrane (aromatic ring containing 2-NH groups) would have chlorine sensitivity like that of the control MPD-polyamide membrane and was, therefore, not chlorine-tested. Chlorine ppm-hours, pH and % Δ salt passage for each of the other novel amine membranes are compared with those of the MPD-control in adjacent columns of Table 1. The results of these dynamic chlorine tests are summarized as follows:

1. Referring to Table 1, the ring-activated polyamide membranes, MPD and 4-ABP, tested at pH 8 (OCl$^-$) experienced improvement and very little degradation, respectively. Continued testing of these two membranes at pH 6, however, resulted in significant and similar (244 and 154%) levels of total salt passage increase.

2. Longer term testing of the 3-ABP membrane directly on pH 5.9 feed produced much less salt passage increase than for the MPD control membrane (255 vs 1685%). Continued testing of these two membranes on the above conditions plus 1000 ppm added calcium chloride appeared to accelerate the degradation resulting in high levels of salt passage. Salt passage increase of the MPD control membrane was more than twice that of the 3-ABP membrane (5120 vs 2143%).

3. The ring-deactivated TDP membrane longer-term tested at pH 8 experienced a 65% increase in salt passage, whereas the MPD membrane decreased by 36%. It is not clear why the TDP membrane exhibited this apparent level of degradation initially. As before, the pH 8 chlorine exposure actually improved the salt rejection performance of the MPD membrane. Continued testing at pH 6, however, resulted in no further salt passage change for the TDP membrane, but a 27% increase for the MPD membrane, indicating a higher rate of degradation for the latter.

4. Finally, the ring-deactivated IDP membrane longer-term tested at pH 6 sustained only 27% salt passage increase compared with 827% increase for the MPD membrane. Continued testing of these two membranes at the above conditions plus 1000 ppm added calcium chloride caused salt passage to increase by 98% for the IDP membrane and by 4550% for the MPD membrane. Again, the MPD membrane sustained much more degradation.

It can thus be concluded that several of the novel monomer membranes provide superior hypochlorous acid resistance when compared to the prior art MPD-based membrane and, therefore, offer improved performance in the presence of this disinfectant.

EXAMPLES A–E

Two or three different membranes were prepared for each of the five polyamines synthesized according to Examples I–V using the methods described below and the variables set forth in Tables 2–6. The test results for these membranes, namely flux and salt rejection, are also set forth in Table 2–6.

Two samples measuring 1½" by 3½" were cut from each of the experimental membranes as prepared in Tables 2–6, then tested on a recirculated feed containing 1500 ppm sodium chloride (pH 7) at 225 psig. The salt rejection and flux rate for each membrane sample were measured after a 1 hour and/or overnight (approximately 18 hours) time period on test.

As can be seen from Tables 2–6, membrane performance can be manipulated through variance of the formulation parameters, such as amine and acid chloride concentration, etc. In general, these novel membranes exhibit a high degree of water permeability compared to the wholly aromatic prior art MPD-based membranes (see Table 1, Example 6). Furthermore, the dipiperazine monomer membranes produced very high water fluxes, up to 3–4 times that of the MPD membrane. Thus these novel membranes will have particular utility in separations involving larger solutes than simple salts with very high water throughput.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

TABLE 1

PERFORMANCE SUMMARY OF NOVEL POLYAMIDE MODEL COMPOUNDS AND MEMBRANES

| Amine Monomer Structure | Model Comp. Chlorine Uptake Mol Cl/mol model Wt % Cl | | Acid Chloride | MEMBRANE | | | | | |
|---|---|---|---|---|---|---|---|---|---|
| | | | | Peformance | | Chlorine Resistance | | | Film Thick. (Å) |
| | | | | Flux (gfd) | Rej (%) | ppm-hrs | % ΔSalt Passage | | |
| | pH 4 | pH 9 | | | | | Amine | MPD | |
| 35-DABP 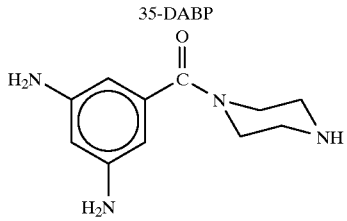 | — | — | TPC | 22–60 | 94–99 | — | — | — | 210 |
| 4-ABP 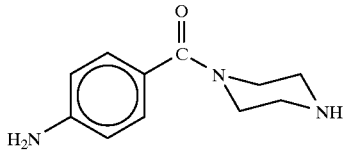 | 1.37 10.4% | 0.46 3.78% | 65TMC 35TPC | 22–55 | 96–99.4 | 2157 pH8 2138 pH6.1 | +8.21 +244 | −46.2 +154 | 250 |
| 3-ABP 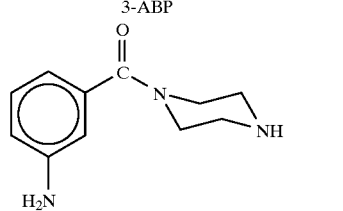 | — | — | 65TMC 35TPC | 25–55 | 95–99 | 6547 pH5.9 2138 pH5.7 +1000 ppm CaCl$_2$ | (+255) +2143 | (+1685) +5120 | 230 |

TABLE 1-continued

PERFORMANCE SUMMARY OF NOVEL POLYAMIDE MODEL COMPOUNDS AND MEMBRANES

| Amine Monomer Structure | Model Comp. Chlorine Uptake Mol Cl/mol model Wt % Cl | | Acid Chlor-ide | MEMBRANE | | | | | |
|---|---|---|---|---|---|---|---|---|---|
| | | | | Peformance | | Chlorine Resistance | | | Film Thick. (Å) |
| | | | | Flux (gfd) | Rej (%) | ppm-hrs | % ΔSalt Passage | | |
| | pH 4 | pH 9 | | | | | New Amine | MPD | |
| TDP | 0.42 2.82% | 0.43 2.88% | TMC | 65–130 | 75–94 | 6098 pH8 2303 pH6 | +65.4 +65.7 | −36.4 +27.3 | 680 |
| IDP | 0.23 1.56% | 0.12 0.81% | TMC | 55–115 | 70–96 | 7622 pH5.9 4239 pH5.9 +1000 ppm CaCl$_2$ | (+27.0) +98.0 | (+827) +4550 | 540 |
| MPD (Control) | 1.76 16.6% | 0.39 4.20% | TMC | 20–30 | 99.6–99.8 | — | — | — | 790 |

Model compounds are dibenzoylated amine monomers.
TMC = trimesoyl chloride
TPC = terephthaloyl chloride
Test Conditions: 225 psig, 1500 ppm NaCl, pH 7 except as indicated.

$$\%\Delta \text{ Salt Passage} = \left( \frac{\text{S.P. Initial-S.P. Final}}{\text{S.P. Initial}} \right) \times 100$$

%Δ SP values in ( ) were obtained directly from chlorinated feed; all others were from dechlorinated feed (fresh standard feed).

TABLE 2

3,5-DIAMINOBENZOYL-1-PIPERAZINE(3,5-DABP)

| MEMBRANE # | 3-5-DABP | TEACSA | SDBS | pH | TPC | SOLVENT | FLUX (gfd) | REJECTION (%) |
|---|---|---|---|---|---|---|---|---|
| 225-59-1 | .30% | .66% | .10% | 9.1 | .10% | ISOPAR G | 21.5[1] | 98.83 |
| 225-59-4 | .30% | .99% | .10% | 9.1 | 1.0% | HEXANE | 56.3[2] | 94.63 |

METHOD:
AMINE POUR & SWIRL 10 SEC
30 SEC DRAIN, HORIZONTAL 3 SEC
ACID CHLORIDE CONTACT 15 SEC, DRAIN 15 SEC,
OVEN DRY 4 MIN @ 150° C.
TEST CONDITIONS:
225 psig, 1500 ppm NaCl, pH 7.0
MEANS OF 2 SAMPLES
[1] = For One Hour
[2] = Overnight

TABLE 3

4-AMINOBENZOYL PIPERAZINE (4-ABP)

| MEMBRANE # | 4-ABP | SDBS | pH | ACID CHLORIDE | SOLVENT | FLUX (gfd) | REJECTION % |
|---|---|---|---|---|---|---|---|
| 229-35-1 | .20% | .25% | 10.1 | .022% TAC 65% TMC 35% TPC | ISOPAR G | 43.0[1] | 98.60 |
| 229-38-5 | .20% | .30% | 10.1 | .022% TAC 65% TMC 35% TPC | ISOPAR H | 30.7[1] | 99.14 |
| 229-45-2 | .20% | .30% | 10.1 | .032% TAC 65% TMC 35% TPC | ISOPAR H | 22.6[1] | 99.35 |

METHOD: AMINE POUR & SWIRL 10 SEC, 30 SEC DRAIN, HORIZONTAL 3 SEC ACID CHLORIDE CONTACT 15 SEC, DRAIN 15 SEC, OVEN DRY 9 MIN @ 125° C.
TEST CONDITIONS: 225 psig, 1500 ppm NaCl, pH 7.0 MEANS OF 2 SAMPLES
TAC = Total Acid Chloride
1 = For One Houre
2 = Overnight

TABLE 4

3-AMINOBENZOYL PIPERAZINE (3-ABP)

| MEMBRANE # | 3-ABP | TEACSA | SDBS | pH | ACID CHLORIDE | SOLVENT | METHOD | FLUX (gfd) | REJECTION (%) |
|---|---|---|---|---|---|---|---|---|---|
| 225-63-4 | .25% | .41% | .10% | 9.1 TEA | .022% TAC 65% TMC 35% TPC | ISOPAR G | A | 51.0[1] | 94.70 |
| 225-66-4 | .25% | .61% | .25% | 9.1 | .016% TAC 65% TMC 25% TPC | ISOPAR L | B | 25.1[1] | 98.69 |
| 225-73-2 | .25% | .61% | .25% | 9.6 TEA | .031% TAC 65% TMC 35% TPC | ISOPAR L | C | 40.5[1] | 98.13 |

METHOD: AMINE POUR & SWIRL 10 SEC 30 SEC DRAIN, HORIZONTAL 3 SEC
(A) ACID CHLORIDE CONTACT 15 SEC, DRAIN 15 SEC, OVEN DRY 4 MIN @ 150° C.
(B) ACID CHLORIDE CONTACT 15 SEC, DRAIN SEC, OVEN DRY 6 min. @ 125° C.
(C) ACID CHLORIDE CONTACT 7.5 SEC, DRAIN 15 SEC, OVEN DRY 6 min. @ 125° C.
TEST CONDITIONS: 225 psig, 1500 ppm NaCl, pH 7.0 MEANS OF 2 SAMPLES
TAC — Total Acid Chloride
1 = for one hour

TABLE 5

TEREPHTHALOYL DIPIPERAZINE (TDP)

| MEMBRANE # | TDP | SDBS | pH | ACID CHLORIDE | SOLVENT | FLUX (gfd) | REJECTION % |
|---|---|---|---|---|---|---|---|
| 225-87-2 | .30% | .25% | 10.7 NaOH | .065% TMC | ISOPAR L | 105[2] | 84.26 |
| 232-14-2 | .30% | .25% | 9.5 HCl | .085% TMC | ISOPAR L | 75.4[1] | 93.15 |
| 232-15-6 | .35% | .25% | 9.5 | .085% TMC | ISOPAR L | 64.6[1] | 94.0 |

METHOD: AMINE POUR & SWIRL 10 SEC, 30 SEC DRAIN, HORIZONTAL 3 SEC ACID CHLORIDE CONTACT 15 SEC, DRAIN 15 SEC, OVEN DRY 6 MIN @ 140° C.
TEST CONDITIONS: 225 psig, 1500 ppm NaCl, pH 7.0 MEANS OF 2 SAMPLES
1 = For One Hour
2 = Overnight

TABLE 6

ISOPHTHALOYL DIPIPERAZINE (IDP)

| MEMBRANE # | IDP | TEACSA | SDBS | pH | ACID CHLORIDE | SOLVENT | FLUX (gfd) | REJECTION (%) |
|---|---|---|---|---|---|---|---|---|
| 235-43-4 | .30% | — | .25% | 12.0 NaOH | .132% TMC | ISOPAR L | 58.6[1] | 95.20 |

TABLE 6-continued

ISOPHTHALOYL DIPIPERAZINE (IDP)

| MEMBRANE # | IDP | TEACSA | SDBS | pH | ACID CHLORIDE | SOLVENT | FLUX (gfd) | REJECTION (%) |
|---|---|---|---|---|---|---|---|---|
| 235-51-4 | .30% | .375% | .25% | 12.0 NaOH | .25% TMC | ISOPAR L | 81.2[1] | 91.43 |
| 235-55-5 | .30% | 2.0% | .25% | 12.0 NaOH | .50% YMC | ISOPAR L | 101[1] | 86.50 |

METHOD: AMINE POUR & SWIRL 10 SEC, 30 SEC DRAIN, HORIZONTAL 3 SEC ACID CHLORIDE CONTACT 15 SEC, DRAIN 15 SEC, OVEN DRY 6 MIN @ 140° C.
TEST CONDITIONS: 225 psig, 1500 ppm NaCl, pH 7.0 MEANS OF 2 SAMPLES
1 = For One Hour

I claim:

1. A water permeable membrane prepared by interfacially polymerizing, on a microporous support: (1) an essentially monomeric polyamine reactant of Formula I:

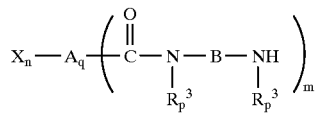

(I)

wherein:
q=0 or 1;
n=0, 1 or 2;
m=2–4, when n=0, but when n=1 or 2, m=1;
when q=1, A=an aromatic (benzene) ring or a $C_3$–$C_6$ alicyclic group and n=1 or 2 and m=1; but when n=0, A=an aromatic (benzene) ring or a $C_3$–$C_8$ alicyclic group and m=2–4;
when q=0, m=2;
B=a $C_2$–$C_6$ alkylene group, when each of p=1 and $R^3$=H or a $C_1$–$C_3$ alkyl group; but when both p=0, NBN forms a saturated heterocyclic ring having two nitrogen atoms and 3–6 carbon atoms; and

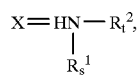

wherein s and t are independently 0 or 1, but are not both =0;
$R^1$=H or a $C_1$–$C_3$ alkyl group when s=1;
$R^2$=$C_1$–$C_3$ alkylene group when t=1; but when s=0, n=1, and $NR^2A$ forms a saturated heterocyclic ring having one nitrogen atom and 3–6 carbon atoms; and (2) an essentially monomeric amine-reactive reactant comprising a polyfunctional aromatic or cycloaliphatic acyl halide or mixture thereof, wherein the amine-reactive reactant has, on the average, at least about 2 acyl halide groups per reactant molecule.

2. The water permeable membrane as claimed in claim 1 wherein polymerization occurs in the presence of a monomeric amine salt.

3. The water permeable membrane as claimed in claim 1, wherein said water permeable membrane is produced by the process comprising the steps of:
   (a) coating a microporous support with an aqueous solution comprising an essentially monomeric polyamine reactant of Formula I to form a liquid layer on said microporous support;
   (b) contacting said liquid layer with an organic solvent solution of an essentially monomeric amine-reactive reactant comprising said polyfunctional acyl halide or mixture thereof; and,
   (c) drying the product of step (b) so as to form said water permeable membrane.

4. The water permeable membrane as claimed in claim 3, wherein said aqueous polyamine solution also contains a monomeric amine salt.

5. The water permeable membrane as claimed in claim 1, wherein said water permeable membrane is produced by the process comprising the steps of:
   (a) coating a microporous support with a first aqueous solution comprising a monomeric amine salt to form a monomeric amine salt layer on said microporous support;
   (b) coating said monomeric amine salt layer with a second aqueous solution comprising an essentially monomeric polyamine reactant of Formula I to form a liquid layer on said monomeric amine salt layer;
   (c) coating said liquid layer with an organic solvent solution of an essentially monomeric amine-reactive reactant comprising said polyfunctional acyl halide or mixture thereof; and
   (d) drying the product of step (c) so as to form said water permeable membrane.

6. The water permeable membrane as claimed in claim 1, wherein said polyamine has at least two amine functional groups per molecule.

7. The water permeable membrane as claimed in claim 1, wherein said polyamine reactant is a mono-piperazine selected from the group consisting of 3,5-diaminobenzoyl piperazine, 3-aminobenzoyl piperazine and 4-aminobenzoyl piperazine.

8. The water permeable membrane as claimed in claim 1, wherein said polyamine reactant is a dipiperazine selected from the group consisting of isophthaloyl dipiperazine and terephthaloyl dipiperazine.

9. The water permeable membrane as claimed in claim 1 wherein said acyl halide has a functionality on the average of from about 2.2 to about 4 acyl halide groups per reactant molecule.

10. The water permeable membrane as claimed in claim 9, wherein said cycloaliphatic acyl halide is selected from cyclohexane, cyclobutane and cyclopentane acyl halides.

11. The water permeable membrane as claimed in claim 9, wherein said aromatic acyl halide is selected from the group consisting of isophthaloyl chloride, trimesoyl chloride, and terephthaloyl chloride.

12. A process for producing a water permeable membrane comprising interfacially polymerizing, on amicroporous support, (1) an essentially monomeric polyamine reactant of Formula I:

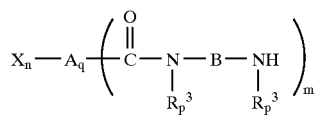 (I)

wherein:
q=0 or 1;
n=0, 1 or 2;
m=2–4, when n=0, but when n=1 or 2, m=1;
when q=1, A=an aromatic (benzene) ring or a $C_3$–$C_6$ alicyclic group, and n=1 or 2 and m=1; but when n=0, A=an aromatic (benzene) ring or a $C_3$–$C_8$ alicyclic group and m=2–4;
when q=0, m=2;
B=a $C_2$–$C_6$ alkylene group, when each of p=1 and $R^3$=H or a $C_1$–$C_3$ alkyl group; but when both p=0, NBN forms a saturated heterocyclic ring having two nitrogen atoms and 3–6 carbon atoms; and

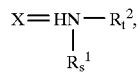

wherein s and t are independently 0 or 1, but are not both =0;
$R^1$=H or a $C_1$–$C_3$ alkyl group when s=1;
$R^2$=a $C_1$–$C_3$ alkylene group when t=1; but when s=0, n=1, and $NR^2A$ forms a saturated heterocyclic ring having one nitrogen atom and 3–6 carbon atoms; and (2) an essentially monomeric amine-reactive reactant comprising a polyfunctional aromatic or cycloaliphatic acyl halide or mixture thereof, wherein the amine-reactive reactant has, on the average, at least about 2 acyl halide groups per reactant molecule.

13. The process as claimed in claim 12, wherein polymerization occurs in the presence of a monomeric amine salt.

14. The process as claimed in claim 12, wherein said water permeable membrane is produced by the process comprising the steps of:
(a) coating a microporous support with an aqueous solution comprising an essentially monomeric polyamine reactant of Formula I to form a liquid layer on said microporous support;
(b) contacting said liquid layer with an organic solvent solution of an essentially monomeric amine-reactive reactant comprising said polyfunctional acyl halide or mixture thereof, and
(c) drying the product of step (b) so as to form said water permeable membrane.

15. The process as claimed in claim 14, wherein said aqueous polyamine solution also contains a monomeric amine salt.

16. The process as claimed in claim 12, wherein said water permeable membrane is produced by the process comprising the steps of:
(a) coating a microporous support with a first aqueous solution comprising a monomeric amine salt to form a monomeric amine salt layer on said microporous support;
(b) coating said monomeric amine salt layer with a second aqueous solution comprising an essentially monomeric polyamine reactant of Formula I form a liquid layer on said monomeric amine salt layer;
(c) coating said liquid layer with an organic solvent solution of an essentially monomeric amine-reactive reactant comprising said polyfunctional acyl halide or mixture thereof; and
(d) drying the product of step (c) so as to form said water permeable membrane.

17. The process as claimed in claim 12, wherein said polyamine has at least two amine functional groups per molecule.

18. The process as claimed in claim 12, wherein said polyamine reactant is selected from the group consisting of 3,5-diaminobenzoyl piperazine, 4-aminobenzoyl piperazine, 3-aminobenzoyl piperazine, isophthaloyl dipiperazine, and terephthaloyl dipiperazine.

19. The process as claimed in claim 12, wherein said cycloaliphatic acyl halide is selected from cyclohexane, cyclobutane and cyclopentane acyl halides.

20. The process as claimed in claim 12, wherein said acyl halide has a functionality on the average of from about 2.2 to about 4 acyl halide groups per reactant molecule.

21. The process as claimed in claim 12, wherein said aromatic acyl halide is selected from the group consisting of isophthaloyl chloride, trimesoyl chloride, and terephthaloyl chloride.

* * * * *